(12) United States Patent
Bhatt et al.

(10) Patent No.: US 9,009,101 B2
(45) Date of Patent: Apr. 14, 2015

(54) REDUCING CONTENTION OF TRANSACTION LOGGING IN A DATABASE MANAGEMENT SYSTEM

(75) Inventors: Vadiraja Puttige Bhatt, Bangalore (IN); Subramanyam Pattipaka, Andhra Pradesh (IN)

(73) Assignee: Sybase, Inc., Dublin, CA (US)

( * ) Notice: Subject to any disclaimer, the term of this patent is extended or adjusted under 35 U.S.C. 154(b) by 649 days.

(21) Appl. No.: 12/829,052

(22) Filed: Jul. 1, 2010

(65) Prior Publication Data
US 2012/0005158 A1    Jan. 5, 2012

(51) Int. Cl.
*G06F 17/30* (2006.01)

(52) U.S. Cl.
CPC .................. *G06F 17/30368* (2013.01)

(58) Field of Classification Search
CPC .......... G06F 11/3636; G06F 17/30368; G06F 17/30604; G06F 9/526; G06F 8/71; G06F 11/2074; G06F 17/30371; G06F 9/3838; G06F 11/1471; G06F 2201/82; G06F 12/0815
USPC ........................ 707/609–660; 711/118–141
See application file for complete search history.

(56) References Cited

U.S. PATENT DOCUMENTS

| | | | | |
|---|---|---|---|---|
| 6,014,674 A | * | 1/2000 | McCargar | 1/1 |
| 6,151,607 A | * | 11/2000 | Lomet | 1/1 |
| 6,185,663 B1 | * | 2/2001 | Burke | 711/156 |
| 6,321,234 B1 | | 11/2001 | Debrunner | |
| 6,721,765 B2 | * | 4/2004 | Ghosh et al. | 1/1 |
| 7,139,927 B2 | * | 11/2006 | Park et al. | 714/4.1 |
| 7,433,898 B1 | * | 10/2008 | Georgiev | 1/1 |
| 8,090,691 B2 | * | 1/2012 | Lynn | 707/648 |
| 2010/0146193 A1 | * | 6/2010 | Jang et al. | 711/103 |
| 2011/0125968 A1 | * | 5/2011 | Kessler et al. | 711/123 |

* cited by examiner

*Primary Examiner* — Michelle Owyang
(74) *Attorney, Agent, or Firm* — Sterne, Kessler, Goldstein & Fox P.L.L.C.

(57) ABSTRACT

System, method, computer program product embodiments and combinations and sub-combinations thereof for reducing contention of transaction logging in a database management system (DBMS) are provided. An embodiment includes creating a dependency relationship among private log caches (PLCs) having individual associations with tasks in a DBMS. The dependency relationship is utilized to control buffer pinning and unpinning among the PLCs without involving a flushing of the PLCs during transactions of the tasks.

20 Claims, 6 Drawing Sheets

---

Creating a Dependency Relationship among PLCs having Individual Associations with Tasks — 410

Utilizing the Dependency Relationship to Control Buffer Pinning/Unpinning among the PLCs without Involving a Flushing of the PLCs during Transactions of the Tasks — 420

REDUCING CONTENTION OF TRANSACTION LOGGING IN A DATABASE MANAGEMENT SYSTEM

BACKGROUND

1. Field of the Invention

The present invention relates to information processing environments and, more particularly, to reducing contention of transaction logging in a data processing system, such as a database management system (DBMS).

2. Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level.

Each day more and more businesses are run from mission-critical systems which store information on server-based database systems, such as Sybase Adaptive Server Enterprise. As a result, increasingly higher demands are being placed on server-based database management systems to "scale" with increased hardware resources—that is, as more sophisticated hardware (e.g., multi-processor units) becomes available, these systems should provide greater throughput.

The logging system of a database system presents a bottleneck to system scalability, however. This is because every insert, update, and delete operation must make a log entry to protect the database from corruption if a system failure or transaction rollback occurs. Most relational databases process a log entry for each update, insert, or delete statement, and each log entry is processed one at a time. When a log entry is written, the logging system must navigate through a synchronization point referred to as the "log semaphore" which controls concurrent access to the log by multiple database transactions. Because every transaction involves the logging system, its efficiency is paramount to transaction throughput. As scalability increases in a database system and transaction volume increases, the contention for logging resources dramatically increases, resulting in reduced system throughput.

One way for reducing contention for logging resources in a transaction processing system is to provide a private log cache (PLC), which provides an area of memory where log records relating to a user's task are built and stored before being posted to the log. Each private log cache may hold multiple log records for a transaction. The private log cache is only written to the log when a transaction commits or when memory fills with log records, thereby reducing steady state contention on the logging system. For further description of a database server system having a private log cache see commonly-owned U.S. Pat. No. 6,321,234, "Database Server System with Improved Methods for Logging Transactions." The disclosure of the foregoing is hereby incorporated by reference for all purposes.

In general, as every task tries to flush its PLC to the log, it acquires an append log semaphore and then flushes the content of PLC to the log. In the past, features like asynchronous log services have been developed to handle a very high rate of PLC and Log flushing. For further description of a database server system with asynchronous logging of transactions, see commonly-owned U.S. Pat. No. 6,721,765, "Database System with Improved Methods for Asynchronous Logging of Transactions". The disclosure of the foregoing is hereby incorporated by reference for all purposes. Asynchronous log services generally reduce the overhead involved in lock acquisition on each PLC and subsequent append log semaphore acquisition to allow flushing of the content to the log, as is generally understood.

While asynchronous logging addresses some of the issues of contention, with increased transaction rates, the log becomes one of the key contention points. Particularly, buffer pinning/unpinning during transactions has been found to adversely affect system performance. Accordingly, a need exists for an approach to reducing contention of transaction logging, including substantially eliminating log contentions due to buffer pinning/unpinning. The present invention addresses these and other needs.

BRIEF SUMMARY

Briefly stated, the invention includes system, method, computer program product embodiments and combinations and sub-combinations thereof for reducing contention of transaction logging in a database management system (DBMS). An embodiment includes creating a dependency relationship among private log caches (PLCs) having individual associations with tasks in a DBMS. The dependency relationship is utilized to control buffer pinning and unpinning among the PLCs without involving a flushing of the PLCs during transactions of the tasks.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 7A:
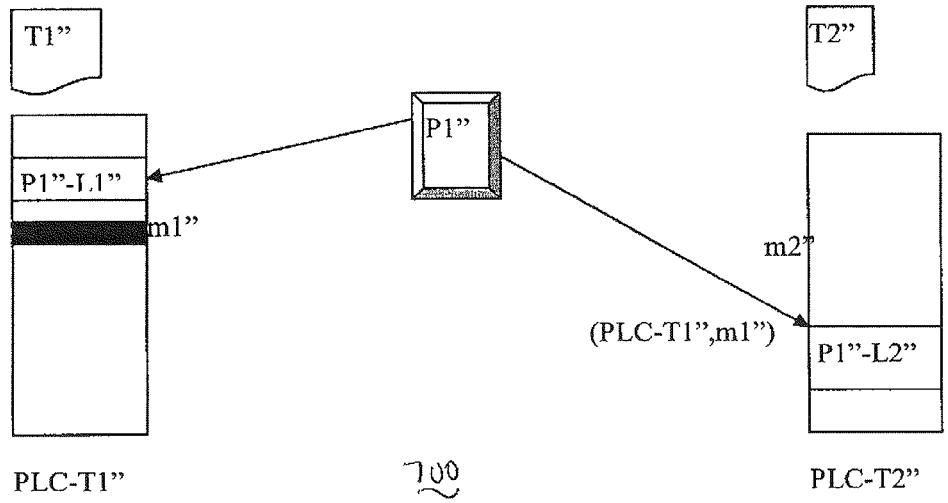
Figure 7B:
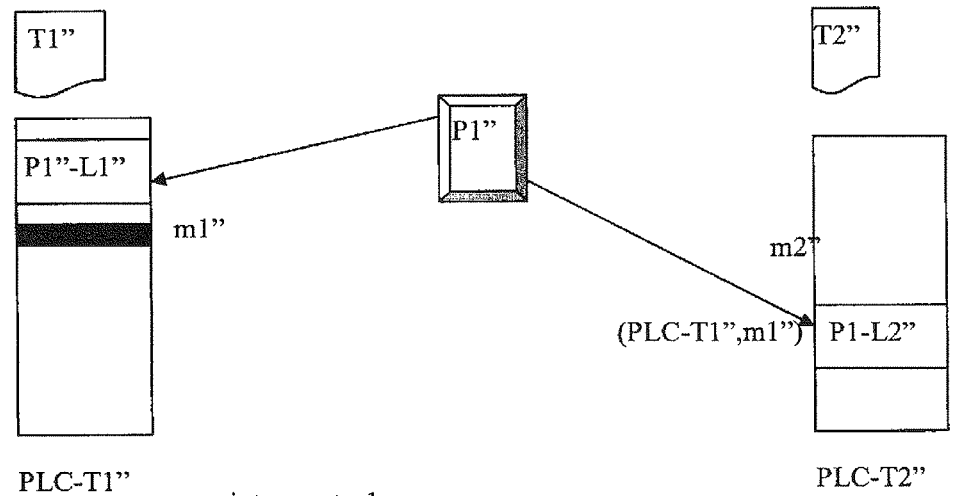

FIGS. 7a-b illustrate example representations of the overall approach with two tasks and a counter in accordance with an embodiment of the invention.

Figure 8:
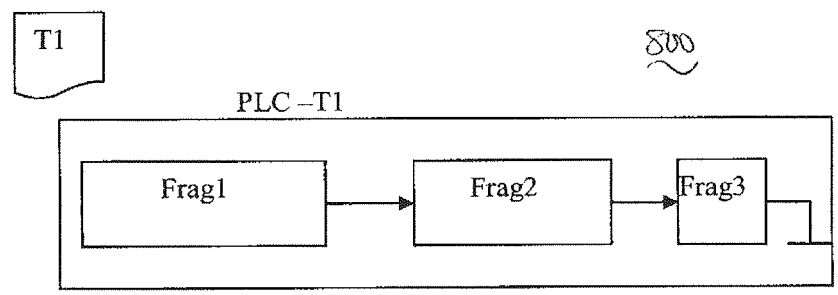

FIG. 8 illustrates an example representation of a fragmented PLC in accordance with an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for reducing contention of transaction logging.

Referring to the figures, exemplary embodiments of the invention will now be described. The following description will focus on the presently preferred embodiment of the present invention, which is implemented in desktop and/or server software (e.g., driver, application, or the like) operating in a connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Figure 1:
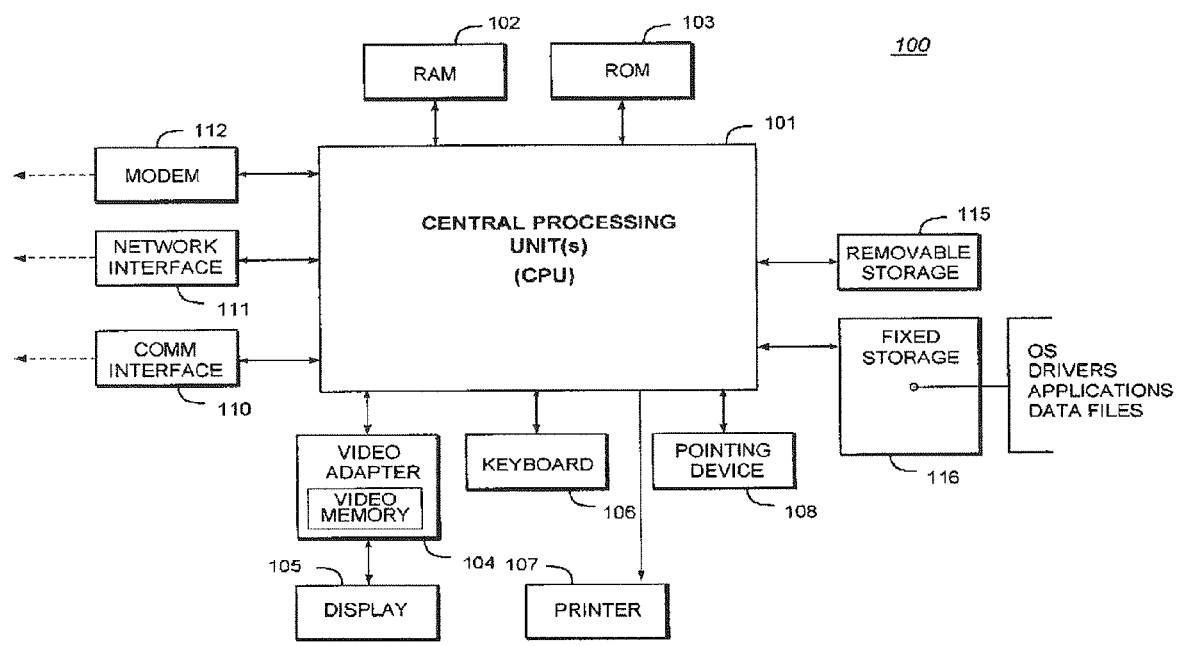
FIG. 1 illustrates a network in which the present invention, or portions thereof, can be implemented, in accordance with an embodiment of the present invention.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Figure 2:
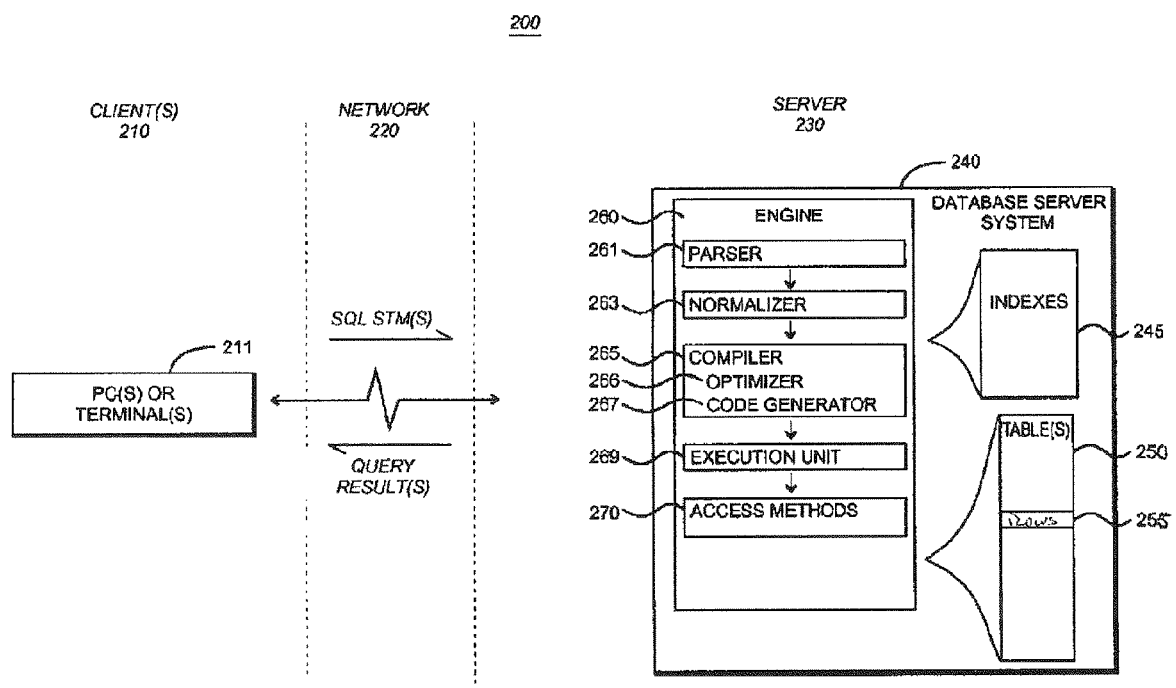
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (ASE, available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 15.0" documentation set from Sybase, Inc. of Dublin, Calif. This product documentation is available via the Internet (e.g., currently at sybooks.sybase.com/). The disclosures of the foregoing are hereby incorporated by reference.

The above-described computer hardware and software are presented for purposes of illustrating the basic underlying desktop and server computer components that may be employed for implementing the present invention. The present invention, however, is not limited to any particular environment or device configuration. Instead, the present invention may be implemented in any type of system architecture or processing environment capable of supporting the methodologies of the present invention presented in detail below.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool. I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed.

Among the issues not fully addressed by current database management system solutions is that with increased transaction rates, the log becomes one of the key contention points. Particularly, buffer pinning/unpinning during transactions has been found to adversely affect system performance. Accordingly, through the embodiments of the present invention, an approach to logging transactions that substantially eliminates log contentions due to buffer pinning/unpinning is provided.

Most relational databases process a log entry for each update, insert, or delete statement, and each log entry is processed one at a time. Since the logging system is a shared resource in a multi-user database system, much contention exists for logging resources, as multiple users require access for performing transactions. At the same time, a database system must control access to the log to prevent one user from overwriting the results of another user.

The logging system of a DBMS typically includes at least two versions of the log: an in-memory version and a disk (or persistent) version. In a current version of Sybase ASE, the in-memory version includes both a shared log cache and a private log cache that is employed to reduce steady state logging contention. The shared log cache exists as page chain in system memory. A plurality of private log caches (PLCs) buffer the log records in system memory instead of directly logging records into the log page chain (i.e., the shared log cache). When a task needs to either flush a private log cache or commit a transaction, the system flushes the log records from the task's private log cache to the shared log cache. At that instance, the task acquires the log semaphore controlling access to the shared log cache and copies all the log records from the private log cache into the shared log cache. The semaphore locks access to the system log table(s) so that a particular task can post log entries, as necessary, without interference from another concurrent task. Using this approach, each task accesses the shared log cache less frequently.

The shared log cache includes data pages storing log records that are linked together in memory to form a chain of pages. The shared log cache is written, at appropriate times, to disk for creating the disk version of the log. In typical operation, when a transaction "commits," the log records must first be flushed from the private log cache to the shared log cache.

Figure 3:
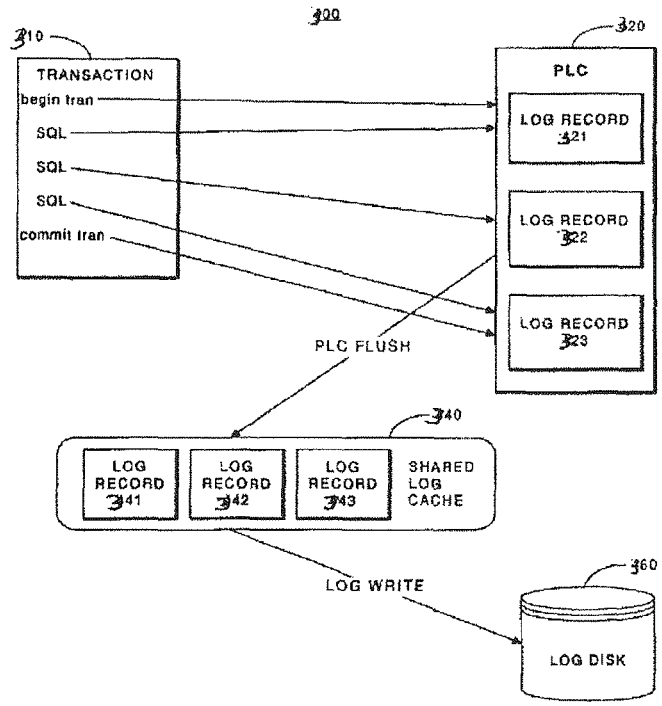
FIG. 3 illustrates, at a high level, the logging operations involved in a typical transaction performed in a database management system

By way of example, FIG. 3 illustrates, at a high level, the logging operations involved in a typical transaction performed in a database management system, such as ASE. As shown, a transaction 310 commences with a begin tran (begin transaction) statement. Each command or request (e.g., SQL command) generates a log record to its own private log cache 320. The private log cache 320 is a region of memory reserved for a particular database connection or "user." For instance, a transaction 310 writes log records 321, 322, 323 to the private log cache 320. At this point, none of these log records is written to the shared log cache 340.

When the transaction 310 is committed, two logging activities are generally triggered as a result. First, the log records 321, 322, 323 are written from the private log cache (PLC) 320 to a general or shared log cache 340 that is available to all users. This involves acquiring the log semaphore controlling access to the shared log cache 340 (so that no one else writes to such page), and flushing (or transferring) the log records 321, 322, 323 from the PLC 320 to the shared log cache 340. New log pages may also need to be allocated during this process of flushing a private log cache. Next, the log records 341, 342, 343 in the shared log cache 340 are written to log disk 360 to persistently store such log records.

"Write-ahead logging" is a general rule applied in database systems governing how a data page (buffer) and its corresponding log records are written to disk. Succinctly stated, the rule dictates that a data page cannot be written to disk until the log records describing the change to that page have been (previously) written to disk. A given transaction will even "sleep" while waiting for its log records to be written to disk. Therefore, the log records must go to disk before the data pages.

Write-ahead logging is implemented by using a "pinning" mechanism. Each data page is associated with a context buffer storing housekeeping information for a data page, including a "log pin." The log pin is a pointer which points to the place in the log indicating up to where in the log the log must be flushed to disk before the data page itself can be written to disk. Until these log records are written to disk, the data page is "pinned" to the shared log cache 340 (i.e., log page chain).

Complementing the notion of pinning is "unpinning." Consider a scenario where a database server's buffer manager desires to write a pinned buffer to disk (e.g., write the page to disk, according to a least-recently used scheme). Before the buffer manager can write that page to disk it should preferably "unpin" the page. As dictated by the write-ahead logging rule, this "unpinning" causes part of the log to be flushed to disk.

To eliminate the contentions on the PLC and reduce contentions on the Log, a mechanism is provided for enhancing the logging routines of the DBMS to reduce contention of transaction logging that avoids repeated flushing of the PLC due to pinning/unpinning.

Figure 4:
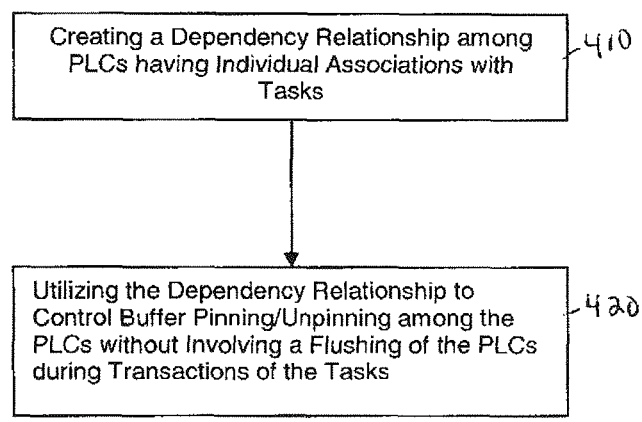
FIG. 4 illustrates a block diagram of an overall approach for reducing contention of transaction logging in accordance with embodiments of the invention.

Referring now to FIG. 4, an overall block diagram is presented for reducing contention of transaction logging in accordance with an embodiment of the invention. The process includes creating a dependency relationship among PLCs having individual associations with tasks in a DBMS (block 410), and utilizing the dependency relationship to control buffer pinning/unpinning among the PLCs without involving a flushing of the PLCs during transactions of the tasks (block 420). As demonstrated in the subsequent description and accompanying examples, creating a dependency relationship includes annotating the PLCs with synchronization markers (sync points). The annotations mark the PLCs according to modifications of pages in the PLCs by unassociated tasks to synchronize an order for flushing of the PLCs. As will be further described, in an embodiment, a counter is utilized to identify a level of dependency of a PLC as a result of the modifications. In embodiments, PLC flushing is performed by a given task, such as in a standard durability environment, or a dedicated flusher task, such as in a relaxed durability environment, to fulfill the dependency relationship.

Figure 5:
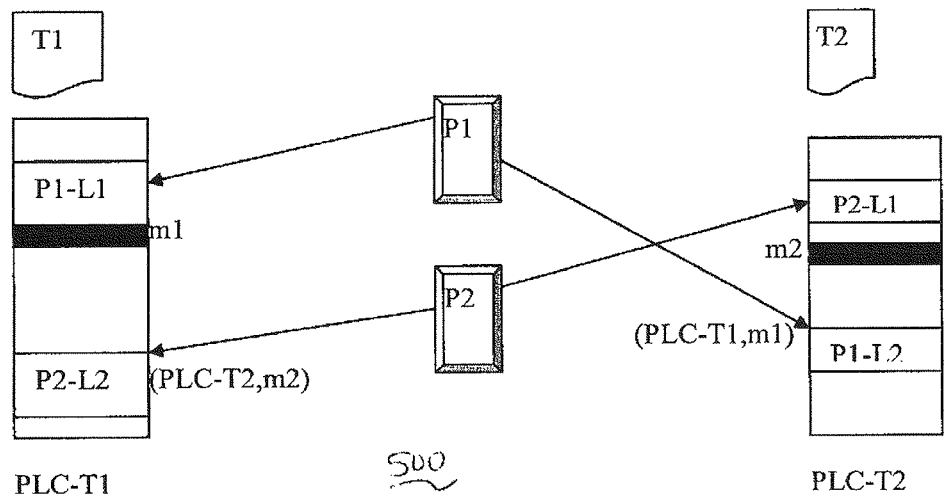
FIG. 5 illustrates an example representation of the overall approach with two tasks in accordance with an embodiment of the invention.

Consider now FIG. 5, which represents an example 500 where two tasks, T1 and T2, with associated PLCs, PLC-T1 and PLC-T2, are trying to modify pages P1 and P2. As shown, task T1 has modified the page P1 and has a log record P1-L1 in PLC1. Task T2 has modified the page P2 and has log record P2-L1 in PLC2. Now task T2 tries to modify the page P1. At this point, P1 is pinned to PLC-T1, which has log records up to marker "m1". In accordance with an embodiment, a synchronization point is placed in PLC-T2, e.g., a tuple (PLC-T1, m1). This tuple identifies the PLC (PLC-T1) and offset (m1) within PLC-T1 up to which a flush is needed before flushing the log record P1-L2. Similarly, when task T1 tries to modify page P2, P2 is pinned to PLC-T2 and currently has log records up to marker "m2". A synchronization marker, e.g., a tuple (PLC-T2, m2), is placed in the PLC-T1 indicating that flushing is needed up to (PLC-T2, m2) before flushing log record P2-L2.

As shown, a dependency relationship is created via the synchronization markers for PLC-T1 and PLC-T2. Once the relationship is created, the process of unpinning involves simply inserting the synchronization point into the current PLC, unpinning the buffer from the old PLC and pinning into the current PLC if needed. In contrast to current approaches, no PLC flushing is involved in this pinning/unpinning operation.

Figure 6:
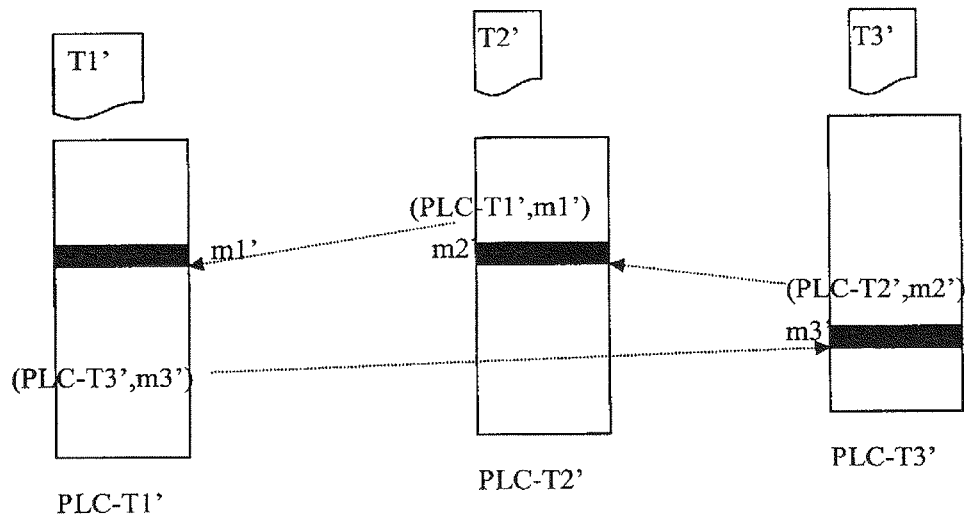
FIG. 6 illustrates an example representation of the overall approach with three tasks in accordance with an embodiment of the invention.

In the case of normal OLTP database with standard durability requirements, flushing the PLC is considered needed when a single log record (SLR) is logged, upon a commit or abort, or when PLC memory space is exhausted. Once a flush is needed, it may occur that there are sync points pointing back and forth from different PLCs to the same PLC. Consider now the example 600 of FIG. 6. As shown, there are three tasks, T1', T2', and T3', which have put sync points that are pointing among all three PLCs, PLC-T1', PLC-T2', and PLC-T3', associated with T1', T2', and T3', respectively. At any point in time there can be only one task flushing its PLC, since the task acquires an append log semaphore before starting the PLC flush.

Suppose, then, that task T1' is triggered to flush PLC-T1'. Consider now the following dependency relationship graph between PLCs, PLC-T1', PLC-T2' and PLC-T3', which can be created using sync points:

(PLC-T1', End of PLC)→(PLC-T3', m3')→(PLC-T2', m2')→(PLC-T1', m1')

In operation, PLC-T1' first gets the append log semaphore, and since it has no sync point until (PLC-T3', m3'), it flushes until that sync point. It then flushes the PLC-T3' until the sync-point (PLC-T2', m2'), and flushes PLC-T2' up to sync-point (PLC-T1', m1'). The tuple (PLC-T1', m1') requests for flushing PLC-T1 up to m1', but this call returns, since PLC-T1' is already flushed beyond m1'. PLC-T2' is then flushed up to m2' before returning and removing marker (PLC-T1', m1'). Similarly, PLC-T3' is flushed up to m3' before returning and removing marker (PLC-T2', m2'). Then, the marker (PLC-T3', m3') is removed, and PLC-T1' is flushed up to its end before returning. Now T2' and T3' can flush a remaining portion of their PLCs with out any issues as sync points are already removed by T1'. Thus, in accordance with an embodiment, the task can flush log records of another PLC without taking a PLC lock on those PLCs while walking through the sync points.

It should be noted that, in an embodiment, while a PLC is being flushed, a task owning another PLC can continue to append log records to that PLC. The memory being worked on by a PLC flusher differs from that used by the task appending log records with no requirement of synchronization, thus removing contention between a PLC flusher and task appending log records, as is well appreciated by those skilled in the art.

In an embodiment, the synchronization markers or flush points are captured simply as tags in any convenient data structure, such as represented in the following PLC-MARKER structure.

```
typedef struct plcmarker
{
struct plcstate *plc_to_flush;    /* PLC to which buffer is pinned */
BYTE    *flush_upto_offset;       /* Offset up to which plc_to_flush
                                  ** has to be flushed
                                  ** before moving ahead.
                                  */
BYTE    *syncpoint_offset;        /* Offset up to which
                                  ** current PLC has to be
                                  ** flushed before flushing
                                  ** plc_to_flush.
                                  */
} PLCMARKER;
```

Correspondingly, a PLC state data structure can be used to support the synchronization points, e.g.,

```
typedef struct plcstate
{
    ....
    BYTE    *plc_offset;              /* offset where next log record
                                      ** will be placed in PLC */
    BYTE    *plc_flush_offset;        /* offset up to which PLC was
                                      ** already flushed */
    uint32  plc_sync_point_count;     /* Number of other PLCs
                                      dependent
                                      ** on this PLC flush */
/*
** PLC markers are suitably implemented as an array efficiently.
*/
    uint32  plc_markers_start;        /* Start of current PLC
                                      ** markers list */
    uint32  plc_markers_end;          /* End of current PLC
                                      ** markers list */
    PLCMARKER plc_markers[MAXMARKERS]; /* List of markers
    for
                                      ** this PLC */
} PLCSTATE;
```

The 'plc_offset' indicates the offset where the next log record will be placed. Hence, any task wanting to commit a transaction should flush its PLC up to the offset indicated by 'plc_offset'. Since a task may flush the PLC of other tasks partially, 'plc_flush_offset' is used to track the offset up to which the PLC is already flushed. As will be demonstrated further by subsequent examples, a 'plc_sync_point_count' field is used to maintain a number of sync points dependent on the PLC flush of a task. The field 'plc_markers' is used to store a list of sync points for the PLC, while 'plc_markers_start' and 'plc_markers_end' are used to track the start and end of the list.

Further data structure support is needed to account for buffer pinning/unpinning among the PLCs. With the delayed PLC flush mechanism of the invention, there is no unpinning and flushing of the PLC while taking an exclusive latch on a buffer, where a latch refers to a light weight synchronization primitive to serialize the access to the buffer. Instead, the buffer is unpinned from a pinned PLC at the time of pinning the buffer to a current PLC, which requires that the buffer be removed from a pinned list of the pinned PLC. In standard techniques, the buffer pin list is implemented as singly linked list. In order to avoid scanning the list while removing this buffer and allow the buffer to be removed from the list efficiently, the list is formed as a doubly linked list in accordance with an embodiment by introducing a field, e.g., 'bxls_prev', to the buffer pin list data structure, as is well appreciated by those skilled in the art. For example,

```
typedef struct syb_buf
{
    ....
    struct syb_buf *bxls_prev;   /* Pointer to previous buffer in list
                                 ** to which this buffer is pinned */
    ....
} BUF;
```

With these data structures, when a task flushes the PLC of another task, the flushing involves only updating 'plc_flush_offset', and flushing until the 'flush_upto_offset'. Any appenders for other PLCs will not be blocked as they don't take the append log semaphore and the PLC flushing task doesn't take PLC lock on other PLCs. In operation, the 'plc_flush_offset' and 'plc_offset' are reset to a start of PLC if there are no sync points on the PLC being flushed.

In order to further streamline processing of user tasks and avoid spending time and resource flushing the PLC, in an embodiment, a PLC flusher task is utilized. When utilized, once the PLCs are annotated with the sync points, and a task is ready to commit, each task may simply queue its PLC to the PLC flusher task and move ahead with further processing until it requires final confirmation about successful PLC flush by PLC flusher task. PLC flusher is a separate task which simply takes a PLC of a task which is committed, then starts flushing it to the log and signals the user task upon completion of the flush. An example of a PLC flusher is described in the aforementioned U.S. Pat. No. 6,721,765. As would occur when an individual task flush occurs, a PLC flusher walks through the sync points and makes sure that before flushing the portion of the PLC at any given location, all sync points inserted before that location are cleared.

Thus, for the example of FIG. 5, if task T1 wants to commit before T2 then it will queue PLC-T1 to flusher task. While flushing the PLC-T1, the PLC flusher flushes the PLC to sync-point (PLC-T2, m1) and then flushes the PLC-T2 up to m2 even though it is not queued to it and then continues with flushing the rest of the PLC-T1. In order to optimize flushing in many different ways, in an embodiment, some assumptions are made for the PLC flusher operation, including that only committed PLCs are queued to the PLC flusher, and if a PLC flusher encounters a sync point of a PLC that is not yet queued, it will flush the PLC partially up to offset specified by the sync point. By queuing the PLC at the commit time to the PLC flusher task, user tasks, which are committing, need not have to spend time and resources flushing the PLC. Further, the flushing of the PLC will not be in the transactional code path, and there will be minimal resource contention at the time of commit as a task simply queues the PLC to the PLC flusher using light weight synchronization primitives like spinlocks and returns to the user, and no PLC lock or append log semaphore is acquired by the user tasks. Further, when a task queues its PLC to the PLC flusher, if a new transaction needs to be started and the current associated PLC is not yet flushed, then a new PLC can be allocated from the PLC pool to the task with marking as detached. This way tasks need not have to wait till the PLC of previous transaction is flushed and are free to proceed and start a new transaction.

In operation, a PLC flusher may flush a PLC partially as part of flushing, resulting in partially flushed PLCs. In order to ensure that it will not subsequently flush such PLCs from the start, the pointer 'plc_flush_offset' is used.

Further, there could be a scenario in which a sync point is encountered that is associated with a PLC that may already have been flushed. For instance, consider the example 700 illustrated in FIG. 7a. A sync point (PLC-T1", m1") exists in PLC-T2". The PLC flusher may first flush the PLC-T1" where there are no sync points. However, when it picks up PLC-T2", it will encounter sync-point (PLC-T1", m1"). But, PLC-T1" may have been freed back to PLC pool, and the PLC flusher may not know that it is already flushed. To resolve this scenario, a sync point counter is introduced. This sync point counter gets incremented whenever another task wants to insert a sync-point in its PLC. For example, referring to 710, FIG. 7b, when task T2" tries to insert sync-point (PLC-T1", m1") into PLC-T2", it increments sync_point_count of the PLC-T1" indicating that there exists a PLC, which has a sync point pointing to this PLC. This is kind of a loose backward pointing from the PLC-T1" to PLC-T2" and indicates a level of dependency of a given task, i.e., the higher the count value, the more tasks there are with a sync point pointing to the given task.

With the counter, the PLC flusher can note the count value when it flushes a PLC, and when not zero, identifies that there exists another PLC from which a sync point has been inserted. Under such circumstance, the PLC flusher flushes the PLC but will not reset the 'plc_flush_offset' pointer and waits until the counter gets decremented. Thus, in the example of FIG. 7b, while flushing PLC-T2", PLC flusher identifies that PLC-T1" is already flushed and decrements the sync_point_count of PLC-T1". It then also resets 'plc_flush_offset' to the start of the PLC-T1", as it observes that the sync point counter for PLC-T1" is 0 and PLC-T1" is completely flushed.

This mechanism ensures that a PLC will not disappear immediately after flush. While this may cause further delay in releasing the PLC back to the PLC pool, it will not cause any delay in the transaction. In an embodiment, in order to better optimize the release of the PLC immediately after flush, the PLC flusher can internally keep track of a (PLC, sync_point_count) tuple and release the PLC resource upon completing the flush of the PLC. In this manner, when a sync point is served, the PLC flusher can determine the internally maintained tuple (PLC, sync_point_count) and decrement it, which results in immediately releasing the resource back to the PLC pool even though the sync_point_count is not zero. Suitably, sync_point_count can be synchronized through a spinlock.

Further optimization by using a PLC flusher task can occur for situations when a first task might have flushed the whole PLC of a second task due to a sync point, but the second task might be sleeping and waiting for the append log semaphore, even though its work is already done by the first task. The PLC flusher task can wake up the second task as soon as it detects that it has finished flushing the PLC for the second task and allow the second task to move ahead.

To further account for the possibility that a PLC may become full, a fragment pool, e.g., PLC pool, is introduced. In an embodiment, every task is allocated a PLC fragment of the pool initially, e.g., the user configured PLC size. When the PLC becomes full, a task acquires another chunk of fragment from the PLC pool to be linked with the current fragment. The PLC thus appears as a chain of fragments to be maintained as the fragments are allocated, as illustrated by an example 800 showing a task T1 and its PLC-T1 being formed as a chain of three fragments, Frag1, Frag2, Frag3, in FIG. 8. When the task is ready to commit, it simply queues the PLC to the PLC flusher, and the PLC flusher, after flushing all the fragments of PLC, frees up the fragments back to the PLC pool, as is commonly understood.

There could be scenarios where the PLC of all the tasks are full and a flush is needed to make space in the fragment pool. In such situations, the PLC flusher can be invoked with a special context, e.g., a "Garbage Collect" context, under which it will walk through all the active transactions and try to flush as much as possible. It is expected that this situation would be a corner case where there are long running transactions dominating the CPU. Alternatively, the manner in which the PLC flusher is queued could be changed to allow the PLC flusher to pace itself with other tasks. For example, a partially filled PLC could be queued to the PLC flusher with one or more fragments while a current task can continue putting data in the new fragments. In this case, the restriction that only committed PLCs are queued to the PLC flusher may have to be relaxed. For example, if there are no sync points in the fragments, or if fragments containing sync points with the PLC in the sync point tuple are committed or flushed, then those fragment can be queued to the PLC flusher, even though the transaction is not committed yet. Another consideration can be made to use of the sync_point_count as one of the feedbacks in the special "Garbage Collect" process. For example, a PLC with a highest sync_point_count value could be flushed first, since a high value of the sync_point_count would be considered to indicate that there are several PLCs which are dependent on this PLC, which would ease the flushing of other PLCs.

As described herein, in accordance with the embodiments of the present invention, PLC flushing occurs in a delayed manner as compared with current techniques and provides several benefits. These benefits include removal of the requirement of PLC flushing during the unpinning operation, and eliminating PLC lock contention between a PLC flusher and user tasks appending log records to the PLC. Further, reduction of one of the key bottlenecks experienced at very high transactional throughput, i.e., the append log semaphore contention, is achieved by removing PLC flushes in the transactional code path. It also helps in removing the unnecessary waits for tasks after taking latches on buffers. With the flexibility offered in the durability requirement, this solution scales well with increased number of transactions.

While the invention is described in some detail with specific reference to a preferred embodiment and certain alternatives, there is no intent to limit the invention to that particular embodiment or those specific alternatives. Further, the description presents methods that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). Those skilled in the art will appreciate that modifications may be made to the preferred embodiment without departing from the teachings of the present invention.

What is claimed is:

1. A method for reducing contention of transaction logging in a database management system (DBMS) having a memory and a processor coupled to the memory, the method comprising:
    creating a dependency relationship among private log caches (PLCs) having individual associations with tasks in the DBMS, wherein the PLCs store log records of the tasks before the log records are posted in the DBMS and, wherein creating the dependency relationship further comprises using synchronization markers as flush points that synchronize an order for flushing the log records stored in the PLCs, and wherein a synchronization marker has a PLC indicator and a memory offset such that the PLC indicator indicates a PLC of the PLCs unassociated with the task and the memory offset indicates a memory location in the PLC unassociated with the task up to which the log records require flushing; and
    controlling, using the synchronization markers, buffer pinning and unpinning among the PLCs without involving a flushing of the PLCs during transactions of the tasks, wherein the controlling buffer pinning and unpinning comprises annotating the PLC of the PLCs associated with the task with the synchronization marker as a flush point that synchronizes an order for flushing log records in the PLC associated with the task and the log records of the PLC unassociated with the task, at the time the log records are being flushed, and
    wherein the PLCs are stored in the memory and the pinning and unpinning among the PLCs uses the processor.

2. The method of claim 1, wherein annotating further comprises marking the PLCs with the synchronization markers according to modifications of pages in the PLCs by unassociated tasks to synchronize an order for flushing of the PLCs.

3. The method of claim 2, wherein flushing of the PLCs occurs without contention between a PLC flusher and a user task appending log records, and with a reduction in contention on buffer latches.

4. The method of claim 2, further comprising utilizing a counter to identify a level of dependency of a PLC as a result of the modifications.

5. The method of claim 1, further comprising performing PLC flushing to fulfill the dependency relationship.

6. The method of claim 5, further comprising utilizing a flusher task for performing PLC flushing.

7. The method of claim 6, where in utilizing a flusher task further comprising reducing PLC flushes in transaction code paths.

8. A system for reducing contention of database transaction logging, the system comprising:
    a computer processing system including one or more processors and one or more memories;
    at least a portion of the one or more memories allocated for private log caches (PLCs), wherein the PLCs store log records of the tasks before the log records are posted in the DBMS; and
    a database management system executing on the one or more processors and utilizing the one or more memories and configured to:
        create a dependency relationship among private log caches (PLCs) having individual associations with tasks wherein creating the dependency relationship further comprises using synchronization markers as flush points that synchronize an order for flushing the log records stored in the PLCs, and wherein a synchronization marker has a PLC indicator and a memory offset such that the PLC indicator indicates a PLC of the PLCs unassociated with the task and the memory offset indicates a memory location in the PLC unassociated with the task up to which the log records require flushing; and
        control, using the synchronization markers, buffer pinning and unpinning among the PLCs without involving a flushing of the PLCs during transactions of the tasks, wherein controlling buffer pinning and unpinning comprises annotating the PLC of the PLCs associated with the task with the synchronization marker as a flush point that synchronizes an order for flushing log records in the PLC associated with the task and the log records of the PLC unassociated with the task, at the time the log records are being flushed.

9. The system of claim 8, wherein the database management system further annotates the PLCs with the synchronization markers according to modifications of pages in the PLCs by unassociated tasks to synchronize an order for flushing of the PLCs.

10. The system of claim 9, wherein the database management system further utilizes a counter to identify a level of dependency of a PLC as a result of the modifications.

11. The system of claim 8, wherein the database management system further performs PLC flushing to fulfill the dependency relationship.

12. The system of claim 11, wherein the database management system further utilizes a flusher task for performing PLC flushing.

13. A computer program product including a non-transitory computer-readable medium having instructions stored thereon that, if executed by a computing device, cause the computing device to perform operations for reducing contention of transaction logging in a database management system (DBMS), the instructions comprising:
    creating a dependency relationship among private log caches (PLCs) having individual associations with tasks in the DBMS, wherein the PLCs store log records of the tasks before the log records are posted in the DBMS and, wherein creating the dependency relationship further comprises using synchronization markers as flush points that synchronize an order for flushing the log records stored in the PLCs, and wherein a synchronization marker has a PLC indicator and a memory offset such that the PLC indicator indicates a PLC of the PLCs unassociated with the task and the memory offset indicates a memory location in the PLC unassociated with the task up to which the log records require flushing; and
    controlling, using the synchronization markers, buffer pinning and unpinning among the PLCs without involving a flushing of the PLCs during transactions of the tasks, wherein the controlling buffer pinning and unpinning comprises annotating the PLC of the PLCs associated with the task with the synchronization marker as a flush point that synchronizes an order for flushing log records in the PLC associated with the task and the log records of the PLC unassociated with the task, at the time the log records are being flushed.

14. The computer program product of claim 13, wherein annotating further comprises marking the PLCs according to modifications of pages in the PLCs by unassociated tasks to synchronize an order for flushing of the PLCs.

15. The computer program product of claim 14, wherein flushing of the PLCs occurs without contention between a PLC flusher and a user task appending log records, and with a reduction in contention on buffer latches.

16. The computer program product of claim 14, further comprising utilizing a counter to identify a level of dependency of a PLC as a result of the modifications.

17. The computer program product of claim 13, further comprising performing PLC flushing to fulfill the dependency relationship.

18. A method for reducing contention of transaction logging in a database management system (DBMS):
providing a first private log cache associated with a first task and a second private log cache associated with a second task, wherein the first private log cache and the second private log cache store log records of the first and second tasks before the log records are posted in the DBMS and wherein the first task modifies a first memory page and the second task modifies a second memory page;
creating a dependency relationship between the first private log cache and the second private log cache when the second task modifies the first memory page, wherein creating the dependency relationship further comprises:
generating a synchronization point in the second private log cache with a synchronization marker, wherein the synchronization marker identifies a memory point in the first private log cache that requires flushing before flushing of the second private log cache can occur; and
inserting the synchronization point into the second private log cache, wherein the synchronization point controls the pinning and unpinning of a buffer that is initially pinned to the second private log cache and unpinned from the second private log cache at the synchronization point and pinned to the first private log cache.

19. The method of claim 18, wherein the synchronization marker indicates the first private log cache and an offset and wherein the offset indicates the memory point in the first private log cache up to which flushing is needed before the flushing of the second private log cache can occur.

20. The method of claim 18, further comprising:
flushing the second private log cache until the synchronization point;
flushing the first private log cache until the offset indicated in the synchronization point; and
flushing the second private log cache from the memory point subsequent to the synchronization point.

* * * * *